A. PREMO.
NUMBERING, FORMING, AND CUTTING DIE.
APPLICATION FILED MAY 18, 1921.
1,407,769.
Patented Feb. 28, 1922.
2 SHEETS—SHEET 1.
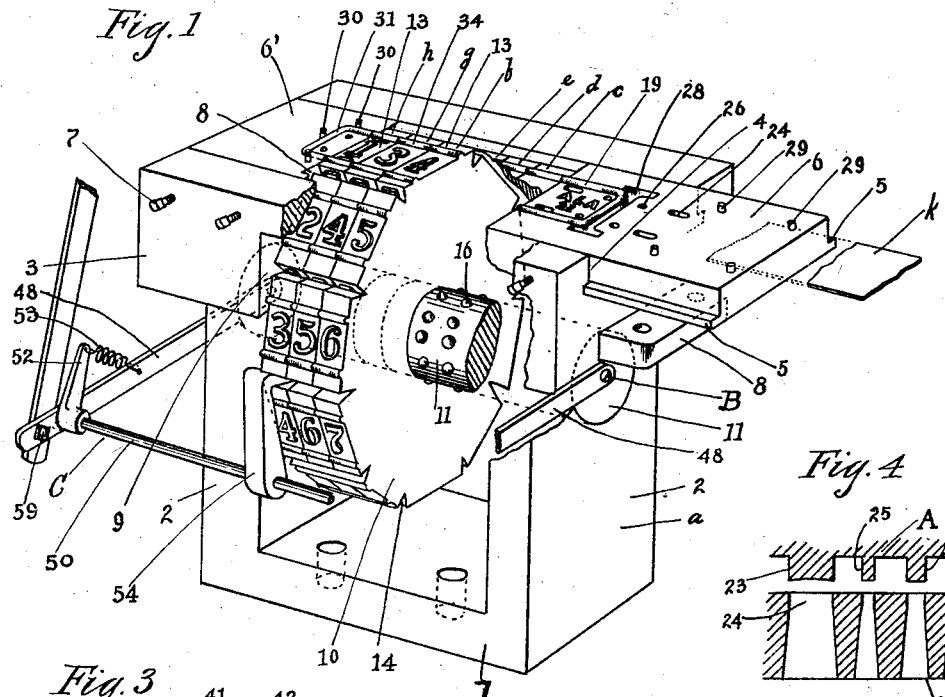
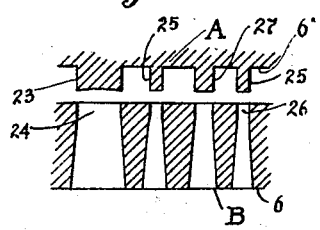
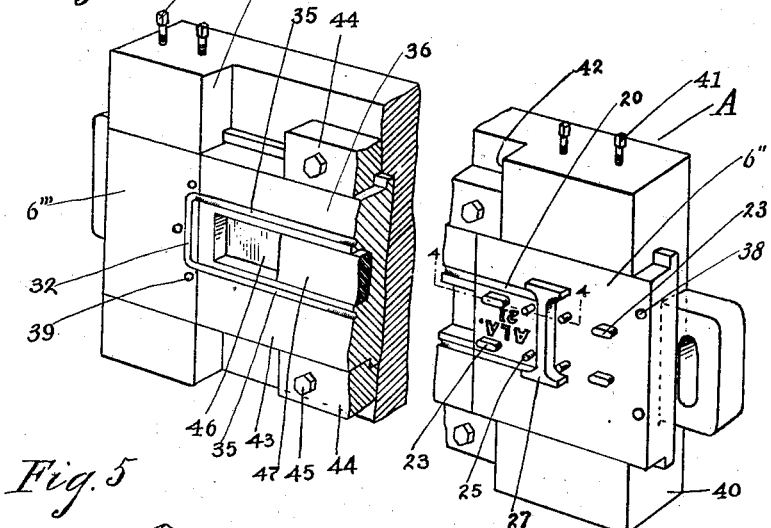
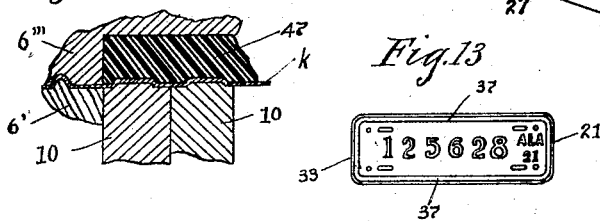
Inventor
Alexander Premo
by H. S. Johnson
Attorney.

A. PREMO.
NUMBERING, FORMING, AND CUTTING DIE.
APPLICATION FILED MAY 18, 1921.
1,407,769.
Patented Feb. 28, 1922.
2 SHEETS—SHEET 2.
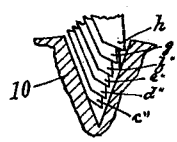
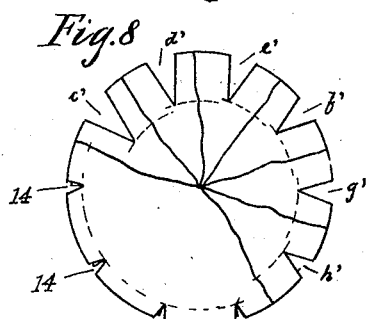
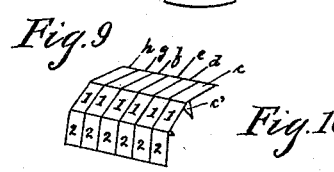
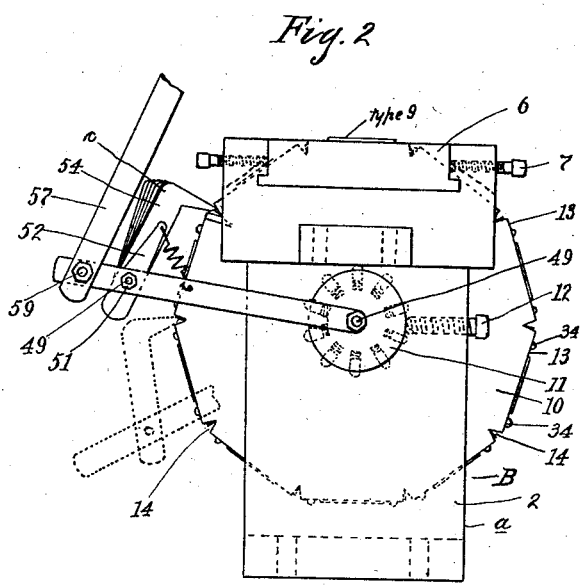
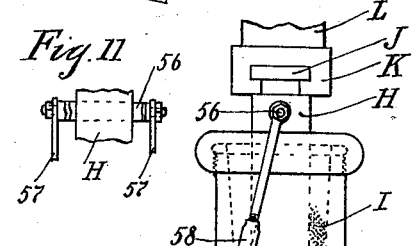
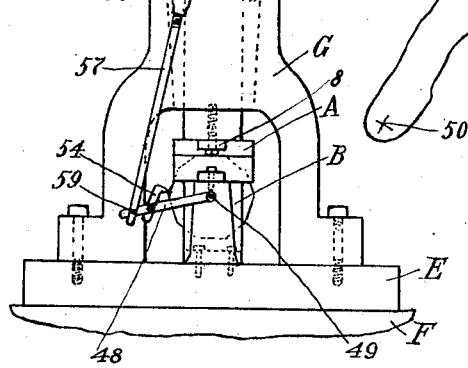
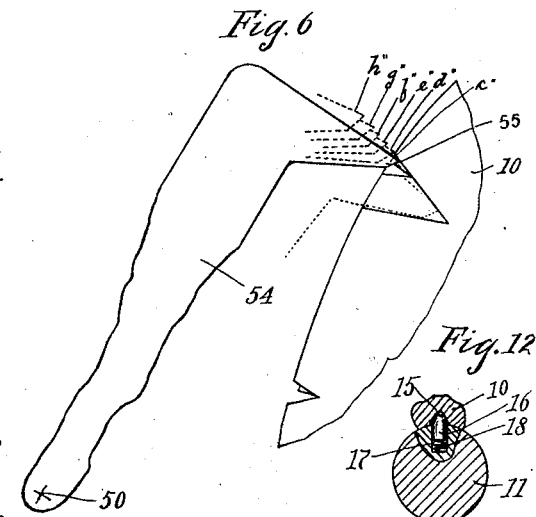
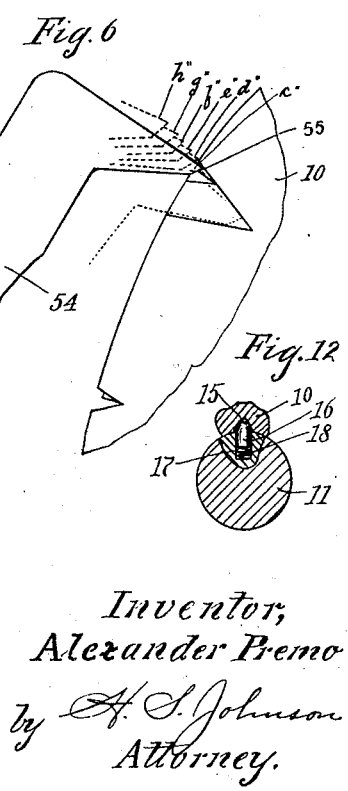
Inventor,
Alexander Premo
by H. S. Johnson
Attorney.

UNITED STATES PATENT OFFICE.

ALEXANDER PREMO, OF WEST ST. PAUL, MINNESOTA.

NUMBERING, FORMING, AND CUTTING DIE.

1,407,769.  Specification of Letters Patent.  Patented Feb. 28, 1922.

Application filed May 18, 1921. Serial No. 470,603.

*To all whom it may concern:*

Be it known that I, ALEXANDER PREMO, a citizen of the United States, residing at the city of West St. Paul, in the county of Dakota and State of Minnesota, have invented certain new and useful Improvements in Numbering, Forming, and Cutting Dies, of which the following is a specification.

This invention relates to dies for use in the manufacture of consecutively numbered embossed automobile license tags, signs, and other articles ordinarily struck out of plate, the principal object of the invention being, the provision of a combination cutting and shaping die, wherein the stock is fed in long strip form, and the cutting and forming operation is progressive.

A further object of the invention, is to provide a die for stamping consecutively numbered articles, wherein the dies forming the consecutive digits, are automatically, progressively, brought into stamping position, by the stroke action of the press.

A still further object of the invention, is to provide a die, for embossing articles, numbered in numerical rotation, having no defined number forming female companion die member, whereby I am enabled to employ, in a practical manner, contiguously mounted rotary disks having peripheral character bearing facets, one disk for each digit of a number of six figures.

By dispensing with the usual co-operating female die members for the numbers, I avoid complication of structure, inasmuch as great difficulty is met with, in keeping a pair of co-operating peripheral disk dies in consonance, it requiring either complicated gear trains or lever system, as well as costly male and female disks.

Another object of the invention, is the provision of a die structure, in connection with rotary die elements whereby that portion of the die impressing the year and the name of the State for which the license issues, may be conveniently and cheaply changed, without entailing any rearrangement of the rotary elements, this feature being important, as only a relatively minor portion of the die need be replaced to render it available for another State.

A still further object of the invention, is the provision of novel counting mechanism adapted to be actuated either by the movement of the ram of a power press, or the plunger of a sub-press, as the case may be.

To this end, the invention consists in the construction, combination and arrangement of parts hereinafter described and claimed.

In the drawings forming part of this specification,

Figure 1 is a perspective view of the male member of a die embodying my invention, parts thereof being shown broken away.

Figure 2 is an end view of same.

Figure 3 is a perspective view of the female die member adapted to coact with the male member, the view being broken away intermediate its ends, to disclose the cross-sectional construction.

Figure 4 is a section on line 4—4 of Figure 3.

Figure 5 is a fragmentary longitudinal sectional view taken on a line cutting through both die members showing the latter in embossing position.

Figure 6 is an enlarged fragmentary view of one of the pawls of the counting mechanism, showing, in dotted lines, the relative fixed positions of all of the pawls on the rock shaft.

Figure 7 is a side view of a part of one of the type disks, showing its master notch, and the position of the noses of the pawls relative thereto, during action.

Figure 8 is a diagram showing the relative sizes of the master notches of the several type disks, and notches of uniform size common to all of the disks.

Figure 9 is a diagram in perspective, indicating the initial normal arrangement of the type disks, when starting the production of a series of automobile tags.

Figure 10 is a front elevation of a sub-press fixed between the ram and bed of a power press shown on a reduced scale, showing my invention attached thereto.

Figure 11 is a side view of the ram of the sub-press showing the pivotal lever connection therewith.

Figure 12 is a transverse sectional view of the type disk arbor showing one of the disk locking pins, and Figure 13 is a front view of an automobile tag as it comes from the die.

The invention comprises a female die member A and a male die member B, the latter including counting mechanism C, of which the type disks form a part.

The male member comprises a housing *a* having an elongated base 1, and uprights 2, at opposite ends thereof, said uprights being joined together at their tops, by the horizontally disposed die shoe 3, the latter extending beyond the sides and ends of the base, so as to overhang the latter, to accommodate die plates of varying lengths. The shoe is formed with a longitudinal central groove 4, the sides thereof being undercut to slidingly receive the tongues 5 of the flat die plates 6 and 6'. These die plates are slidable longitudinally in the shoe, and are held positioned therein by the set screws 7. The shoe is further provided at its ends with outstanding lugs 8, whereby the die member may be bolted to the bed of the press. Intermediate its ends, the underside of the shoe is cut away to form a wide rectangular rabbet, extending transversely across the shoe, and cutting through the bottom of the groove 4, the opening between the side walls 9 of the rabbet, forming a clearance space for the type disks 10, which latter are rotatably mounted on the longitudinally disposed arbor 11, said arbor being removably supported at its ends in the uprights 2, and rigidly held positioned thereon by the set screw 12. In the drawings six disks are shown, which are designated by the letters c—d—d—f—g— and h. The disks are made of hard metal and are mounted on the arbor in contiguous successive relation, each being formed with ten flat peripheral facets 13, and each facet formed with a type designating a number raised above its flat surface. The disks may be termed rotary numbering dies, the facets of each disk carrying type dies consecutively numbered 1—2—3—4—5—6—7—8—9—0. Separating the facets are the V shaped notches or indents 14 cutting transverse across the disks, nine of said indents of each disk being of uniform depth. The tenth indent (hereinafter referred to as the master indent) of each disk differs in depth from the tenth indent of all the others, disks, the master indents becoming progressively deeper step by step from the disk h to the disk c. Cut in the wall of the bore of each disk (Fig. 12) is the socket 15 adapted to receive any of the annular series of lock pins 16 on the arbor, each of the latter being slidable in a radially disposed recess 17, the latter containing a coil spring 18 whereby, the pin is forced under stress into said socket. Each of the pins has a coniform terminal of suitable shape, to cause it to be pushed into its recess by the slanted walls of the socket, responsive to a rotary impulse imparted to the disk. Two series of lock pins only are shown, but it is to be understood that there is a series for each disk, each series being so positioned on the arbor, as to bring the facets successively into impressing position, or, in other words, on the level with top surfaces of the die plates 6 and 6'. The die plate 6 is formed with the U shaped bead projection 19, which latter co-operates with the groove 20, (Fig. 3) to form the beaded end 21 of the tag (Fig. 13). Referring to the female die member A, the oblong punches 23 on the die plate 6'' are adapted to enter the male die openings 24, while the punches 25 enter the die openings 26. Between the punches 26, is the male member 27 of the cutting off and end cutting die, the latter co-operating with the female die opening 28 (Fig. 1). Obviously, a strip of metal k, fed forwardly between the pilot pins 29, will be simultaneously severed and blanked at its end to form the rounded corners of the tag. The blanked end is now projected across the type disks and brought to rest against the stop pins 30, the latter being mounted on the die plate 6', and suitably spaced from the bead projection 31 the latter adapted to co-operate with the die groove 32 in the die plate 6''' (Fig. 3), to form the beaded end 33 of the tag (Fig. 13). It will be noted, that each of the type disks carry sections of raised bead 34 in direct alignment with the bead projections 19 and 31, so as to form a continuous bead, said sections co-operating with the grooves 35, in the die plate 36, (Fig. 3) to form the long side beads 37 of the tag. Suitable clearance holes 38 in the die plate 6'' receive the pilot pins 29 while the clearance holes 39 in the die plate 6''' receive the stop pins 30. The die plates 6''' are similar in cross section to the die plate 6, and are slidable in the shoe 40, which latter is longitudinally grooved after the manner of shoe, the plates being held positioned by the set screws 41. Intermediate its ends the shoe 40 is rabbeted out to form the transverse shoulders 42. Fitted in this transverse rabbet, is the embossing die plate 43, wherein the die grooves 35 are cut. This die plate is similar in cross section to the die plate 6, and is held positioned by the cleats 44 cap screwed to the shoe by the cap screws 45. Centrally, longitudinally, the die plate 43, is formed with a long rectangular recess 46, which is of a size, to generously cover the six type brought into stamping position by the disks. This recess 46, solidly packed with rubber 47 or other resilient material. Obviously in operation, when the die plates of the two die members are brought into embossing relation with the tag blank between them, as shown in Figure 5, the raised type of the disks and the tag blank will be forced into the body of the confined rubber tending to displace same which latter, obedient to the tremendous pressure set up in the rubber holding recess, will press the metal of the blank around the type. In this manner a metal female die member is eliminated, together with all the usual complicated mechanism necessary to keep coacting disks in consonance, thereby rendering the present invention relatively simple and cheap of construction. When it is desired to change the name of the State, only the die plates 6 and 6″ need be replaced, the rest of the die members remaining intact.

The counting mechanism C, comprises the outwardly extending links 48, having pivotal connection 49 in the center of the arbor 11, at opposite ends thereof. The links are joined together by the rock shaft 50, which latter extends rotatably, at its ends, through the respective links 48, and is held positioned therein, by the lock nuts 51. Rigid on the rock shaft one at each end thereof, is the lever arm 52, the free end thereof being connected with the tension spring 53, which latter extends to and is fastened on the links 48, so that the rock shaft tends constantly to rotate toward the disks. Rigid on the rock shaft, one for each disk 10, and in front of the latter, are the pawls 54, only one being shown in Fig. 1. These pawls (Fig. 2) are mounted on the rock shaft so that their noses 55 will be positioned, in regular progression one in advance of the other, beginning with the disk $h$ and progressing toward the disk $c$. This is best shown in Figs. 6 and 7, wherein the noses are designated by the letters identifying the disks, to which they belong. As hereinbefore stated, each type disk, has a master indent, the degree of differentiation, between the several master indents being clearly illustrated in the diagram Fig. 8, wherein the indents, are also marked with the letters identifying their respective disks. As shown in Fig. 7, the offset positions, circumferentially, of the noses of the pawls, are coordinated to varying depths of the indents. The master indents of all disks are located between the facets carrying the types 1 and 0 respectively, best shown in Fig. 9, wherein is diagrammatically shown, the arrangement of the disks, at the beginning of a counting operation. Responsive to a reciprocating movement of the links, the pawls will ride over the disk on the downward stroke and engage the indent as shown in dotted lines Fig. 2. On the up stroke, the disk will be rotated, to prevent the next succeeding facet of the disk to the descending ram which latter carries the female die member.

When the disk $c$ has revolved to bring its type 9 into embossing position as is shown in Fig. 2, its master indent will be engaged by its pawl thereby permitting the latter to fall deeper, which in turn permits the next adjacent pawl to enter one of its regular notches and thereby revolve its disk on the upstroke. The next upstroke therefore will simultaneously move both disks C and $d$, thereby moving type 9 out of position and positioning type 0 of disk $c$, type 1 of disk $d$, thus setting up the number 10. When disk $d$ has revolved to bring its type 9 into set position, its master indent will be engaged by its pawl, and thereby permit the pawl of the next adjacent disk $e$ to enter one of its regular notches, resulting in the disks $c$—$d$— and $e$ being moved with the next upstroke of the pawls thereby setting up the number 100.

This action is repeated until the last disk $h$ has been actuated to bring its type 9 into embossing position.

In Fig. 10, I have shown my improved die set up in a sub-press, it being desirable to have the upper and lower portions of the die combined into one self-contained unit, so arranged as to always hold the upper and lower members in exact allignment with each other. The sub-press consists of a base E suitably clamped to the table F of a suitable power press, or what may be termed, a super press. G designates the frame or barrel fitted to the base, and H the plunger, slidable vertically in the usual Babbitt bearing I in the barrel. The plunger head J or button as it is sometimes termed, is connected to the upper press by the hook K the latter forming part of the ram L of the super-press. The die members are shown in embossing position, the plunger H being at the end of its down stroke and the pawls 54 set to for the upstroke.

Pivotally connected to the plunger, as by means of the horizontal pivot bolt 56, the latter extending at right angles through the plunger, are the adjustable connecting rods 57, having turn-buckle adjustment 58. The lower ends of the rods have pivotal connection 59 with the respective links 48. Obviously, the rods may be connected directly to the super-press, and the die members attached to the latter in the usual manner.

In operation, the ram L actuates the plunger, which in turn vibrates the links 48.

I claim:

1. In combination with a press having a reciprocable plunger, a lower stationary die member having cutting and forming die surfaces, an upper die member secured to said plunger and having cutting and forming die surfaces fitted to said lower die member so as to coact with the die surfaces thereof, reciprocatory counting mechanism, said mechanism including reciprocatory connecting means and a plurality of contiguously rotatably mounted disks rotatable around an axis common to all the disks, a part of the peripheries thereof forming a part of the die surfaces of said lower die member, said disks having circumferentially spaced number dies on their peripheries adapted to be brought successively into die forming position, and operative connections between said reciprocatory connecting means and plunger, said connections being coordinated to the reciprocating movement of the latter whereby said number dies will be moved into die forming position on the upstroke of the plunger.

2. In combination with a press having a reciprocable plunger, a lower stationary die member having oppositely disposed spaced die plates formed with cutting and forming die instrumentalities, an upper die member mounted on the plunger and having cutting and forming die instrumentalities fitted to said lower die member so as to coact with the die instrumentalities thereof, counting mechanism mounted on said stationary die member, said mechanism including rotatably mounted disks having spaced peripheral number dies with intervening notches, the notch between two certain number dies being deeper than the rest and the specified notch of all of the disks being progressively deeper, said disks extending upwardly to a position between said die plates to bring their die members representing the sum into die forming position, actuating means operatively connecting said mechanism and plunger to actuate the former by the movement of the latter, said actuating means embodying a pawl for each disk relatively fixed to the other pawls to successively engage in the specified notches to rotate the disks, and die instrumentality formed of a resilient substance forming part of the die instrumentalities of said upper die member said substance arranged to compressingly engage with said die numbers representing the sum.

3. In combination with a press having a vertically reciprocable plunger, a housing on the press directly beneath the plunger, counting mechanism mounted on said housing and operatively connected with said plunger to be operated by the movement of the latter, said mechanism including rotary disks having spaced peripheral number dies and means for successively moving one of said number dies at every upstroke of said plunger in regular arithmetical progression to die forming position, an upper die member secured to the plunger having an inset rubber die instrumentality adapted to compressingly engage with said number dies to effect a dieing operation, and co-operating die plates removably held on said housing and upper die member, on opposite sides of said number dies.

4. In combination with a press having a reciprocable plunger, a die for forming automobile tags from strips of metal comprising a lower stationary die member having cutting and forming die instrumentalities, an upper die member mounted on said plunger, and having cutting and forming die instrumentalities fitted to coact with those of said lower die member, said coacting instrumentalities comprising in part, bead forming die portions for forming a partly completed bead around the edge of the tag, and a cut off die at the strip receiving end formed to blank adjacent ends of the tag out of the strip, reciprocatory counting mechanism connected with said plunger to be actuated thereby responsive to the reciprocation of the latter, said counting mechanism including flat sided rotatable disks mounted side by side each side thereof formed with number dies, and means for successively moving one of said number dies at every upstroke of said plunger, in regular arithmetical progression to die forming position, rubber in a recess in said upper die member to compressingly engage the numbers in die forming position to effect an embossing operation, and bead forming die sections on each of said flat sides of said rotatable disks aligning and co-operating with said bead forming portions of said die instrumentalities whereby to complete the bead around the tag.

5. In a stamping machine, a housing, a series of embossing disks journaled therein, said housing having a central opening through which the disks project and from which on opposite sides lead guideways, and die plates adjustable in the guideways, said embossing disks and die plates having complemental stamping parts.

6. In a stamping machine, a female die comprising a shoe having a transverse groove, adjustable die plates in the groove, and an interposed die plate removable independently of the first die plates and formed with a recess having a resilient insert.

In testimony whereof I affix my signature.

ALEXANDER PREMO.